United States Patent
Kamatani et al.

(10) Patent No.: US 11,001,251 B2
(45) Date of Patent: May 11, 2021

(54) HYBRID VEHICLE CATALYST WARM UP

(71) Applicant: Toyota Jidosha Kabushiki Kaisha, Toyota (JP)

(72) Inventors: Hideki Kamatani, Toyota (JP); Kazuma Aoki, Toyota (JP); Koji Hokoi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 92 days.

(21) Appl. No.: 16/197,963

(22) Filed: Nov. 21, 2018

(65) Prior Publication Data

US 2019/0161070 A1 May 30, 2019

(30) Foreign Application Priority Data

Nov. 27, 2017 (JP) .............................. JP2017-226558

(51) Int. Cl.
*B60W 20/15* (2016.01)
*B60K 6/26* (2007.10)
(Continued)

(52) U.S. Cl.
CPC ............... *B60W 20/15* (2016.01); *B60K 6/24* (2013.01); *B60K 6/26* (2013.01); *B60K 6/28* (2013.01);
(Continued)

(58) Field of Classification Search
CPC ...... B60W 10/06; B60W 10/08; B60W 20/00; B60W 20/13–14; B60W 20/16;
(Continued)

(56) References Cited

U.S. PATENT DOCUMENTS

| 2004/0123836 A1* | 7/2004 | Nishigaki | ............... B60L 50/16 123/350 |
| 2009/0099759 A1* | 4/2009 | Sasaki | ............... B60K 6/448 701/113 |

(Continued)

FOREIGN PATENT DOCUMENTS

| JP | 2010179780 A | | 8/2010 |
| JP | 2011105133 A | * | 6/2011 |

(Continued)

OTHER PUBLICATIONS

Niimi, Kuniaki—English Description and Claims of JP-2011105133-A, via Espacenet Patent Translate, retrieved May 28, 2020 (Year: 2020).*

(Continued)

*Primary Examiner* — Jeffrey C Boomer
*Assistant Examiner* — Paul Allen
(74) *Attorney, Agent, or Firm* — Dinsmore & Shohl LLP (57) ABSTRACT

During a hybrid drive, a hybrid vehicle sets an engine required power based on a driving required power and controls an engine to output the engine required power, while controlling a motor to drive the hybrid vehicle with the driving required power. When a catalyst temperature of an exhaust emission control device is equal to or lower than a predetermined temperature that requires warming up, in the state that an output upper limit power which a power storage device is allowed to output is equal to or larger than a predetermined power, the hybrid vehicle sets a power calculated by subtracting the output upper limit power from the driving required power, to the engine required power. In the state that the output upper limit power is smaller than the predetermined power, the hybrid vehicle sets the driving required power to the engine required power.

7 Claims, 4 Drawing Sheets

(51) Int. Cl.
| | |
|---|---|
| *B60K 6/28* | (2007.10) |
| *B60W 10/06* | (2006.01) |
| *B60W 10/08* | (2006.01) |
| *F02D 35/00* | (2006.01) |
| *B60K 6/24* | (2007.10) |
| *F01N 3/10* | (2006.01) |
| *F01N 9/00* | (2006.01) |
| *F02D 41/02* | (2006.01) |
| *F02D 41/06* | (2006.01) |
| *F02N 11/08* | (2006.01) |

(52) U.S. Cl.
CPC ............ *B60W 10/06* (2013.01); *B60W 10/08* (2013.01); *F01N 9/00* (2013.01); *F02D 35/0015* (2013.01); *F02D 41/024* (2013.01); *F02D 41/068* (2013.01); *B60W 2540/00* (2013.01); *B60W 2710/06* (2013.01); *B60W 2710/08* (2013.01); *B60Y 2200/92* (2013.01); *B60Y 2300/192* (2013.01); *F01N 3/101* (2013.01); *F01N 2590/11* (2013.01); *F01N 2900/08* (2013.01); *F01N 2900/104* (2013.01); *F01N 2900/1602* (2013.01); *F02D 2200/0802* (2013.01); *F02D 2200/501* (2013.01); *F02D 2250/18* (2013.01); *F02D 2250/21* (2013.01); *F02N 11/0822* (2013.01); *F02N 2200/062* (2013.01)

(58) Field of Classification Search
CPC .. B60W 20/15; B60W 10/26; B60W 2540/00; B60W 2710/06; B60W 2710/08; B60W 2530/12; B60W 2510/244; B60W 2710/0677; B60K 6/00; B60K 6/26; B60K 6/28; B60K 6/24; B60K 6/445; F01N 2590/11; F01N 3/101; F01N 3/2013; F01N 9/00; F01N 2900/08; F01N 2900/1602; F01N 2900/104; F01N 2900/0602; B60Y 2200/92; B60Y 2300/192; B60Y 2300/474; F02D 41/024; F02D 41/068; F02D 35/0015; F02D 2250/21; F02D 2200/501; F02D 2200/0802; F02D 2250/18; F02N 11/0822; F02N 2200/062; Y02A 50/20; Y02T 10/40; Y02T 10/62; Y02T 10/12
USPC ................................. 701/22; 180/65.21–65.29
See application file for complete search history.

(56) References Cited

U.S. PATENT DOCUMENTS

| | | | |
|---|---|---|---|
| 2010/0204864 | A1 | 8/2010 | Ando et al. |
| 2011/0213524 | A1* | 9/2011 | Matsumoto ............ B60W 10/06 701/22 |
| 2014/0288743 | A1* | 9/2014 | Hokoi .................... B60W 10/06 701/22 |
| 2016/0264124 | A1* | 9/2016 | Hotta ................. B60W 50/0097 |
| 2018/0066622 | A1* | 3/2018 | Jeong .................... F02N 11/108 |
| 2018/0086334 | A1* | 3/2018 | Oguma .................. B60W 10/06 |

FOREIGN PATENT DOCUMENTS

| | | | |
|---|---|---|---|
| JP | 2012071739 A | | 4/2012 |
| JP | 2013-154706 A | | 8/2013 |
| JP | 2013154706 A | * | 8/2013 |
| JP | 2015-155276 A | | 8/2015 |

OTHER PUBLICATIONS

Endo, Hiroki—English Translation of JP-2013154706-A description, via Espacenet Patent Translate, Dec. 4, 2020 (Year: 2020).*

* cited by examiner

HYBRID VEHICLE CATALYST WARM UP

CROSS-REFERENCE TO RELATED APPLICATION

This application claims priority to Japanese Patent Application No. 2017-226558 filed on Nov. 27, 2017, the contents of which is incorporated herein by reference.

TECHNICAL FIELD

The present disclosure relates to a hybrid vehicle.

BACKGROUND

A proposed configuration of a hybrid vehicle sets a power calculated by subtracting an allowable battery output power from a driving power which a user requires, to an engine required power, when the driving power is larger than the allowable battery output power, during warm-up of a catalyst in an exhaust emission control device provided for exhaust emission control (as described in, for example, JP 2010-179780A). Even when the catalyst warm-up has not yet been completed and the battery is not allowed to output the driving power, such control enables the hybrid vehicle to be driven with output of the driving power, while suppressing deterioration of the emission.

CITATION LIST

Patent Literature

PTL 1: JP2010-179780A

SUMMARY

A recently proposed type of hybrid vehicle charges a battery with electric power from an external power supply and gives priority to a motor drive until a state of charge SOC of the battery becomes equal to or lower than a reference value. In this type of hybrid vehicle, a large allowable battery output power is set to allow for the motor drive even with a relatively large power. Accordingly, in response to the driver's high acceleration request, an engine start request is given to start an engine, and catalyst warm-up control is performed to warm up a catalyst filled in an exhaust emission control device provided in an exhaust system of the engine. In the configuration that the engine is operated with setting the power calculated by subtracting the allowable battery output power from the driving power, to an engine required power like the proposed configuration of the above hybrid vehicle, a small allowable battery output power due to some reason increases the rate of power to be output from the engine to the driving power. This increases a deviation due to a response delay of the engine output power from a change of the driving power and causes the driver to feel slow. One possible measure causes the response delay to be covered by the power from the battery, in order to reduce such a deviation. This measure, however, sets a power calculated by subtracting the allowable battery output power from the driving power, to the engine required power. This causes an excessive power to be output from the battery.

A hybrid vehicle of the present disclosure mainly aims to suppress the driver from feeling slow with respect to a change in driving required power, while suppressing deterioration of the emission.

Solution to Problem

In order to achieve the above primary object, the hybrid vehicle of the disclosure is implemented by an aspect described below.

The present disclosure is directed to a hybrid vehicle. The hybrid vehicle includes an engine provided with an exhaust emission control device in an exhaust system thereof and configured to output a power for driving the vehicle, a motor configured to output a power for driving the vehicle, a power storage device configured to transmit electric power to and from the motor and a control device configured to control the motor such as to drive the hybrid vehicle with a driving required power that is based on a driver's operation, during a motor drive with stopping operation of the engine, and to set an engine required power based on the driving required power and control the engine such as to output the engine required power, while controlling the motor such as to drive the hybrid vehicle with the driving required power, during a hybrid drive with operation of the engine. When a catalyst temperature of the exhaust emission control device is equal to or lower than a predetermined temperature that requires warming up, (1) in a state that an output upper limit power which the power storage device is allowed to output is equal to or larger than a predetermined power, the control device sets a power calculated by subtracting the output upper limit power from the driving required power, to the engine required power, and (2) in a state that the output upper limit power is smaller than the predetermined power, the control device sets the driving required power to the engine required power.

During the motor drive with stopping operation of the engine, the hybrid vehicle of this aspect controls the motor to drive the hybrid vehicle with the driving required power that is based on the driver's operation. During the hybrid drive with operation of the engine, the hybrid vehicle of this aspect sets the engine required power based on the driving required power and controls the engine to output the engine required power, while controlling the motor to drive the hybrid vehicle with the driving required power. When the catalyst temperature of the exhaust emission control device provided in the exhaust system of the engine is equal to or lower than the predetermined temperature that requires warming up, in the state that the output upper limit power which the power storage device is allowed to output is equal to or larger than the predetermined power, the power calculated by subtracting the output upper limit power from the driving required power is set to the engine required power. In this case, a large part of the driving required power is output from the power storage device. This configuration reduces the exhaust emission from the engine. As a result, this ensures the driving force which the driver requires, while suppressing deterioration of the emission. When the catalyst temperature is equal to or lower than the predetermined temperature, in the state that the output upper limit power is smaller than the predetermined power, on the other hand, the driving required power is set to the engine required power. In this case, the driving required power is basically output from the engine, and a response delay of engine power relative to a change of the driving required power is covered by the power from the power storage device. This configuration suppresses the driver from feeling slow with respect to a change in the driving required power, compared with the case where the power calculated by subtracting the output upper limit power from the driving required power is set to the engine required power. As a result, this suppresses the driver from feeling slow with respect to a change of the driving required power, while suppressing deterioration of the emission.

DESCRIPTION OF EMBODIMENTS

The following describes aspects of the present disclosure with reference to some embodiments.

Embodiment

Figure 1:
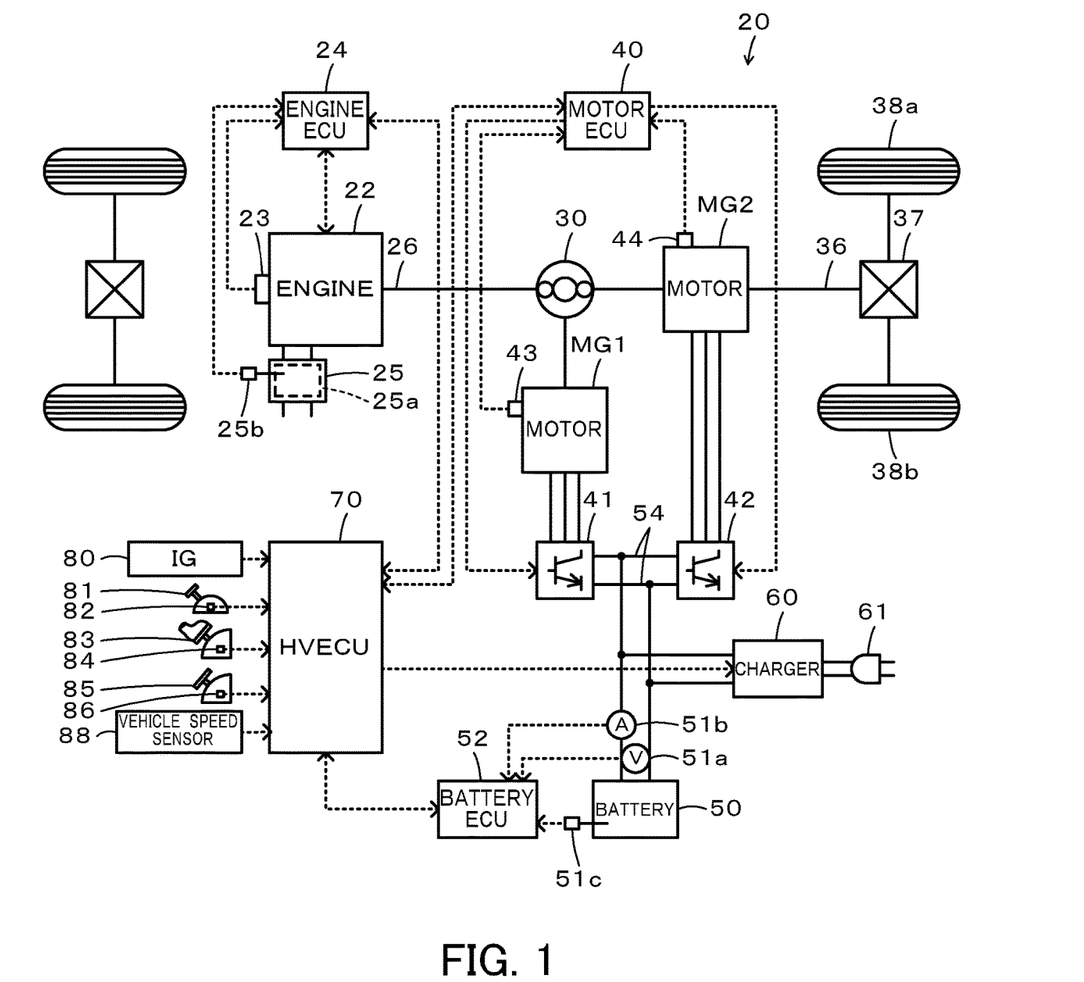
FIG. 1 is a configuration diagram illustrating the schematic configuration of a hybrid vehicle 20 according to one embodiment of the present disclosure.

FIG. 1 is a configuration diagram illustrating the schematic configuration of a hybrid vehicle 20 according to one embodiment of the present disclosure. As illustrated, the hybrid vehicle 20 of the embodiment includes an engine 22, a planetary gear 30, motors MG1 and MG2, inverters 41 and 42, a battery 50, a charger 60 and a hybrid electronic control unit (hereinafter referred to as "HVECU") 70.

The engine 22 is configured as an internal combustion engine to output power using, for example, gasoline or light oil as a fuel. An exhaust emission control device 25 is provided in an exhaust system of the engine 22 and is filled with a conversion catalyst (three-way catalyst) 25a serving to convert toxic components such as carbon monoxide (CO), hydrocarbons (HC) and nitrogen oxides (NOx). The engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22 are input into the engine ECU 24 via the input port. The signals input into the engine ECU 24 include, for example, a crank angle θcr from a crank position sensor 23 configured to detect the rotational position of a crankshaft 26 of the engine 22 and a throttle position TH from a throttle valve position sensor (not shown) configured to detect the position of a throttle valve. There are also various other input signals including a temperature (catalyst temperature) Tc of the conversion catalyst (three-way catalyst) 25a from a temperature sensor 25b mounted to the exhaust emission control device 25.

Various control signals for operation control of the engine 22 are output from the engine ECU 24 via the output port. The control signals output from the engine ECU 24 include a control signal to a throttle motor configured to regulate the position of the throttle valve, a control signal to a fuel injection valve, and a control signal to an ignition coil integrated with an igniter, in addition to various other output signals.

The engine ECU 24 is connected with the HVECU 70 via the respective communication ports to operate and control the engine 22 in response to control signals from the HVECU 70 and to output data regarding the operating conditions of the engine 22 to the HVECU 70 as needed basis. The engine ECU 24 calculates a rotation speed of the crankshaft 26, i.e., a rotation speed Ne of the engine 22, based on the crank angle θcr from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 38a and 38b via a differential gear 37. The planetary gear 30 further includes a carrier that is connected with the crankshaft 26 of the engine 22.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are connected with the battery 50 via power lines 54. A motor electronic control unit (hereinafter referred to as "motor ECU") 40 performs switching control of a plurality of switching elements (not shown) included in the inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2 are input into the motor ECU 40 via the input port. The signals input into the motor ECU 40 include rotational positions θm1 and θm2 from rotational position detection sensors 43 and 44 configured to detect the rotational positions of the respective rotors of the motors MG1 and MG2. The input signals also include phase currents from current sensors configured to detect electric currents flowing in the respective phases of the motors MG1 and MG2.

The motor ECU 40 outputs via the output port, for example, switching control signals to the plurality of switching elements (not shown) included in the respective inverters 41 and 42. The motor ECU 40 is connected with the HVECU 70 via the respective communication ports to drive and control the motors MG1 and MG2 in response to control signals from the HVECU 70 and to output data regarding the driving conditions of the motors MG1 and MG2 to the HVECU 70 as needed basis. The motor ECU 40 calculates rotation speeds Nm1 and Nm2 of the respective motors MG1 and MG2, based on the rotational positions δm1 and θm2 of the respective rotors of the motors MG1 and MG2 input from the rotational position detection sensors 43 and 44.

The battery 50 may be configured as, for example, a lithium ion rechargeable battery or a nickel metal hydride battery. This battery 50 is connected with the inverters 41 and 42 via the power lines 54 as described above. This battery 50 is under management of a battery electronic control unit (hereinafter referred to as battery ECU) 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a battery voltage Vb from a voltage sensor 51$a$ placed between terminals of the battery 50, a battery current Ib from a current sensor 51$b$ mounted to an output terminal of the battery 50, and a battery temperature Tb from a temperature sensor 51$c$ mounted to the battery 50.

The battery ECU 52 is connected with the HVECU 70 via the respective communication ports to output data regarding the conditions of the battery 50 to the HVECU 70 as needed basis. The battery ECU 52 calculates a state of charge SOC, based on an integrated value of the battery current Ib input from the current sensor 51$b$. The state of charge SOC denotes a ratio of the capacity of electric power dischargeable from the battery 50 to the overall capacity of the battery 50. The battery ECU 52 also calculates an input limit Win and an output limit Wout, based on the calculated state of charge SOC and the battery temperature Tb from the temperature sensor 51$c$. The input limit Win denotes an allowable maximum power (input upper limit power) to be charged into the battery 50, and the output limit Wout denotes an allowable maximum power (output upper limit power) to be discharged from the battery 50.

The charger 60 is connected with the power lines 54 and is configured to charge the battery 50 with electric power from an external power supply when a power plug 61 is connected with the external power supply such as a domestic power supply. This charger 60 includes an AC-DC converter and a DC-DC converter. The AC-DC converter serves to convert AC power from the external power supply that is supplied via the power plug 61, into DC power. The DC-DC converter serves to convert a voltage of the DC power from the AC-DC converter and supply the DC power of the converted voltage to the battery 50. When the power plug 61 is connected with the external power supply, the HVECU 70 controls the AC-DC converter and the DC-DC converter, so that the charger 60 supplies the electric power from the external power supply to the battery 50.

The HVECU 70 is configured as a CPU-based microprocessor and includes a ROM configured to store processing programs, a RAM configured to temporarily store data, input/output ports and a communication port, in addition to the CPU, although not being illustrated. The signals input into the HVECU 70 include, for example, an ignition signal from an ignition switch 80, a shift position SP from a shift position sensor 82 configured to detect an operating position of a shift lever 81, and a vehicle speed V from a vehicle speed sensor 88. The input signals also include an accelerator position Acc from an accelerator pedal position sensor 84 configured to detect a depression amount of an accelerator pedal 83 and a brake pedal position BP from a brake pedal position sensor 86 configured to detect a depression amount of a brake pedal 85. The input signals further include a drive mode SMD from a drive mode changeover switch (not shown) configured to change over between a motor drive mode (EV drive mode) in which the hybrid vehicle 20 runs without operation of the engine 22 and a hybrid drive mode (HV drive mode) in which the hybrid vehicle 20 runs with operation of the engine 22.

The HVECU 70 outputs, for example, a control signal to the charger 60 via the output port. The HVECU 70 is connected with the engine ECU 24, the motor ECU 40 and the battery ECU 52 via the respective communication ports as described above to transmit various controls signals and data to and from the engine ECU 24, the motor ECU 40 and the battery ECU 52.

The hybrid vehicle 20 of the embodiment having the above configuration may be driven by a hybrid drive (HV drive) or driven by a motor drive (EV drive). The HV drive causes the hybrid vehicle 20 to run with operation of the engine 22. The EV drive causes the hybrid vehicle 20 to run with stop of operation of the engine 22.

During a run by the HV drive, the HVECU 70 basically performs drive control as described below. The HVECU 70 first sets a required torque Td* required for driving (i.e., to be output to the driveshaft 36), based on the accelerator position Acc from the accelerator pedal position sensor 84 and the vehicle speed V from the vehicle speed sensor 88. The HVECU 70 subsequently calculates a driving required power Pd* which the driver requires for driving, by multiplying the set required torque Td* by a rotation speed Nd of the driveshaft 36. The rotation speed Nd of the driveshaft 36 used here may be a rotation speed calculated by multiplying the rotation speed Nm2 of the motor MG2 or the vehicle speed V by a conversion factor. The HVECU 70 then sets an engine required power Pe* required for the vehicle by subtracting a charge-discharge required power Pb* of the battery 50 (which takes a positive value when the battery 50 is discharged) from the calculated driving required power Pd*. The charge-discharge required power Pb* is set based on a difference ΔSOC between the state of charge SOC of the battery 50 and a target state of charge SOC* as the control center, such as to decrease an absolute value of the difference ΔSOC. The HVECU 70 subsequently sets a target rotation speed Ne*, a target torque Te* of the engine 22 and torque commands Tm1* and Tm2* of the motors MG1 and MG2, such that the engine required power Pe* is output from the engine 22 and that the required torque Td* is output to the driveshaft 36. The HVECU 70 sends the target rotation speed Ne* and the target torque Te* of the engine 22 to the engine ECU 24, while sending the torque commands Tm1* and Tm2* of the motors MG1 and MG2 to the motor ECU 40. The engine ECU 24 performs intake air flow control, fuel injection control and ignition control of the engine 22, such that the engine 22 is operated with the target rotation speed Ne* and the target torque Te*. The motor ECU 40 performs switching control of the respective transistors included in the inverters 41 and 42, such that the motors MG1 and MG2 are respectively driven with the torque commands Tm1* and Tm2*. During the run by the HV drive, when the engine required power Pe* becomes smaller than a reference value Pref, the HVECU 70 determines that a stop condition of the engine 22 is satisfied, stops the operation of the engine 22 and shifts the drive of the hybrid vehicle 20 to the run by the EV drive.

During a run by the EV drive, the HVECU 70 basically performs drive control as described below. The HVECU 70 first sets the required torque Td*, based on the accelerator position Acc from the accelerator pedal position sensor 84 and the vehicle speed V from the vehicle speed sensor 88. The HVECU 70 subsequently sets a value 0 to the torque command Tm1* of the motor MG1. The HVECU 70 also sets the torque command Tm2* of the motor MG2, such that the required torque Td* is output to the driveshaft 36. The HVECU 70 sends the torque commands Tm1* and Tm2* of the motors MG1 and MG2 to the motor ECU 40. The motor ECU 40 controls the inverters 41 and 42 in the same manner as that described above. During the run by the EV drive, when the engine required power Pe* calculated by the same procedure as that during the run by the HV drive becomes equal to or larger than the reference value Pref, the HVECU 70 determines that a start condition of the engine 22 is satisfied, starts the engine 22 and shifts the drive of the hybrid vehicle 20 to the run by the HV drive.

In a system off state of the hybrid vehicle 20 of the embodiment at home or at a preset charge point, in response to input of a connection detection signal from a connection detection sensor (i.e., in response to connection of the power plug 61 with an external power supply), the HVECU 70 controls the charger 60 to charge the battery 50 with electric power from the external power supply to a full charge state or to a predetermined charge state that is slightly lower than the full charge state. On a system start after charging of the battery 50, the hybrid vehicle 20 is driven in a CD mode (charge depleting mode) that gives priority to a decrease in state of charge SOC of the battery 50 until the state of charge SOC of the battery 50 becomes equal to or lower than a threshold value Shv (for example, 25%, 30% or 35%). The hybrid vehicle 20 is driven in a CS mode (charge sustaining mode) to keep the state of charge SOC of the battery 50 after the state of charge SOC of the battery 50 becomes equal to or lower than the threshold value Shy. The configuration of the embodiment sets a sufficiently large value to the reference value Pref in the CD mode compared with that in the CS mode and thereby gives priority to the EV drive over the HV drive in the CD mode, while giving priority to the HV drive over the EV drive in the CS mode.

Figure 2:
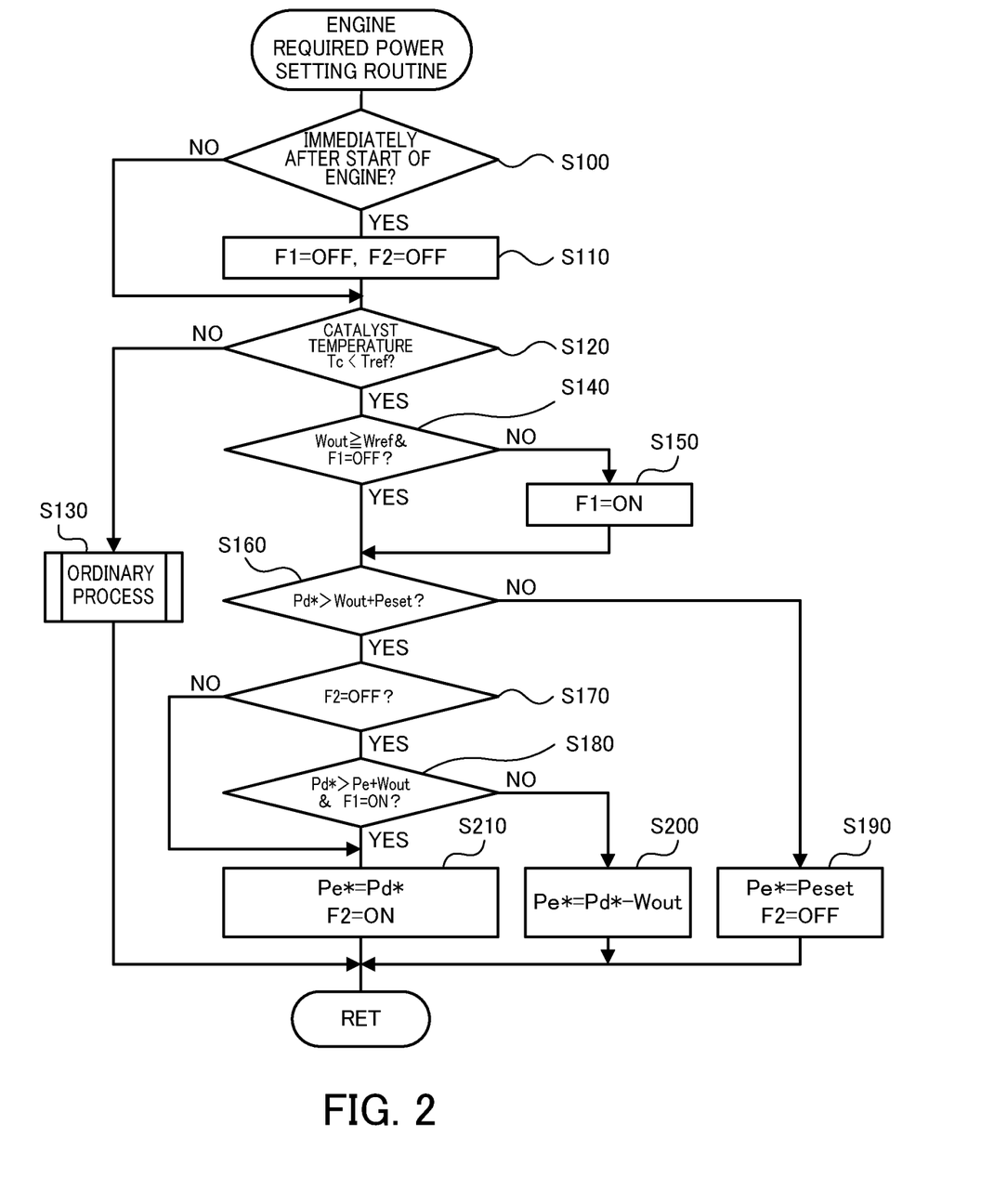
FIG. 2 is a flowchart showing one example of an engine required power setting routine performed by an HVECU 70.

The following describes the operations of the hybrid vehicle 20 having the configuration described above or more specifically a series of operations to set the engine required power Pe* when warm-up is required in a low temperature condition of the catalyst 25a of the exhaust emission control device 25. FIG. 2 is a flowchart showing one example of an engine required power setting routine performed by the HVECU 70. This routine is performed repeatedly while the engine 22 is driven.

When the required power setting routine is triggered, the HVECU 70 first determines whether it is immediately after a start of the engine 22 and thereby determines whether this routine is performed for the first time after a start of the engine 22 (step S100). When it is determined that this routine is performed for the first time after a start of the engine 22, the HVECU 70 sets flags F1 and F2 OFF (value 0) as an initial process (step S110). The flags F1 and F2 may be set ON (value 1) and set OFF (value 0) in this routine. When it is determined that this routine is performed for the second or subsequent time after a start of the engine 22, on the other hand, the HVECU 70 proceeds to step S120 without performing the initial process.

The HVECU 70 subsequently determines whether the catalyst temperature Tc from the temperature sensor 25b is lower than a reference value Tref (step S120). The reference value Tref is a temperature threshold value used to determine whether there is a need to warm up the conversion catalyst 25a of the exhaust emission control device 25. When the catalyst temperature Tc is equal to or higher than the reference value Tref, the HVECU 70 determines that there is no need to warm up the conversion catalyst 25a, performs ordinary process to set the engine required power Pe* by subtracting the charge-discharge required power Pb* of the battery 50 from the driving required power Pd* (step S130) as described above with regard to the run by the HV drive, and then terminates this routine.

When it is determined at step S120 that the catalyst temperature Tc is lower than the reference value Tref, the HVECU 70 subsequently determines whether the output limit Wout of the battery 50 is equal to or larger than a reference value Wref and whether the flag F1 is OFF (step S140). The reference value Wref used here may be a value smaller than the ordinary output limit Wout of the battery 50. It is here assumed that the output limit Wout of the battery 50 is at an ordinary level and is sufficiently larger than the reference value Wref and that it is immediately after a start of the engine 22. In this case, the flag F1 is set OFF (value 0) as an initial value, so that an affirmative answer is given at step S140.

The HVECU 70 subsequently determines whether the driving required power Pd* is larger than a total power of the output limit Wout of the battery 50 and a catalyst warming-up engine power Peset (step S160). The catalyst warming-up engine power Peset denotes a power that is output from the engine 22 on average during catalyst warm-up control and may be determined by experiment or the like. According to the embodiment, the catalyst warm-up control may be a control of the engine 22 to be operated under a slight load and to lag (delay) an ignition timing compared with the ordinary time. Lagging the ignition timing aims to maximize conversion of the energy of explosive combustion of the engine 22 into heat and transmit the heat energy to the exhaust emission control device 25 on the downstream side.

When it is determined at step S160 that the driving required power Pd* is equal to or smaller than the total power of the output limit Wout of the battery 50 and the catalyst warming-up engine power Peset (negative answer), the hybrid vehicle 20 can be driven with power output from the battery 50. The HVECU 70 accordingly sets the catalyst warming-up engine power Peset to the engine required power Pe* (step S190) in order to perform the catalyst warm-up control and then terminates this routine. In this case, the catalyst warm-up control is performed. During continuation of the state that the catalyst temperature Tc is lower than the reference value Tref and that the driving required power Pd* is equal to or smaller than the total power of the output limit Wout of the battery 50 and the catalyst warming-up engine power Peset, affirmative answers are given at steps S120 and S140 and a negative answer is given at step S160. The HVECU 70 then sets the catalyst warming-up engine power Peset to the engine required power Pe* at step S190. This continues the state that the catalyst warming-up engine power Peset is set to the engine required power Pe* and continues the catalyst warm-up control. As a result, this suppresses deterioration of the emission.

When it is determined at step S160 that the driving required power Pd* is larger than the total power of the output limit Wout of the battery 50 and the catalyst warming-up engine power Peset (affirmative answer), on the other hand, the HVECU 70 subsequently determines whether the flag F2 is OFF (value 0) (step S170). Since it is immediately after a start of the engine 22 and the output limit Wout of the battery 50 is equal to or larger than the reference value Wref, the flag F2 is set OFF (value 0) as the initial value, and an affirmative answer is given at step S160. In this case, the HVECU 70 subsequently determines whether the driving required power Pd\* is larger than a total power of the output limit Wout of the battery 50 and an engine power Pe and whether the flag F1 is ON (value 1) (step S180). The engine Power Pe denotes a power that is actually output from the engine 22 and may be calculated from the torque of the motor MG2. Since it is immediately after a start of the engine 22, the flag F1 is similarly set OFF (value 0) as the initial value. A negative answer is accordingly given at step S180, irrespective of whether the driving required power Pd\* is larger than the total power of the output limit Wout of the battery 50 and the engine power Pe. The HVECU 70 subsequently sets a power calculated by subtracting the output limit Wout of the battery 50 from the driving required power Pd\*, to the engine required power Pe\* (step S200) and then terminates this routine. In this case, a larger part of the driving required power Pd\* is output from the battery 50. This relatively decreases the power to be output from the engine 22 and suppresses deterioration of the emission, compared with the case where a large power is to be output from the engine 22. This also ensures the driving force required for driving the vehicle. During continuation of the state that the catalyst temperature Tc is lower than the reference value Tref, that the driving required power Pd\* is larger than the total power of the output limit Wout of the battery 50 and the catalyst warming-up engine power Peset and that the driving required power Pd\* is equal to or smaller than the total power of the output limit Wout of the battery 50 and the engine power Pe, affirmative answers are given at steps S120, S140, S160 and S170, and a negative answer is given at step S180. The HVECU 70 accordingly sets the power calculated by subtracting the output limit Wout of the battery 50 from the driving required power Pd\* to the engine required power Pe\* at step S200. This continues the state that the power calculated by subtracting the output limit Wout of the battery 50 from the driving required power Pd\* is set to the engine required power Pe\*. As a result, this suppresses deterioration of the emission and ensures the driving force required for driving the vehicle.

In the case where the output limit Wout of the battery 50 is kept equal to or larger than the reference value Wref, when the driving required power Pd\* is equal to or smaller than the total power of the output limit Wout of the battery 50 and the catalyst warming-up engine power Peset, the HVECU 70 sets the catalyst warming-up engine power Peset to the engine required power Pe\* (step S190) and performs the catalyst warm-up control. When the driving required power Pd\* is larger than the total power of the output limit Wout of the battery 50 and the catalyst warming-up engine power Peset, on the other hand, the HVECU 70 sets the power calculated by subtracting the output limit Wout of the battery 50 from the driving required power Pd\*, to the engine required power Pe\* (step S200) and interrupts the catalyst warm-up control. This means that either the processing of step S190 or the processing of step S200 is selectively performed.

The following description is on the assumption that the output limit Wout of the battery 50 is smaller than the reference value Wref. In this case, a negative answer is given at step S140, and the flag F1 is set ON (value 1) (step S150). When it is determined at step S160 that the driving required power Pd\* is equal to or smaller than the total power of the output limit Wout of the battery 50 and the catalyst warming-up engine power Peset (negative answer), the HVECU 70 sets the catalyst warming-up engine power Peset to the engine required power Pe\* (step S190) in order to perform the catalyst warm-up control as in the case where the output limit Wout of the battery 50 is equal to or larger than the reference value Wref, and then terminates this routine. During continuation of the state that the catalyst temperature Tc is lower than the reference value Tref and that the driving required power Pd\* is equal to or smaller than the total power of the output limit Wout of the battery 50 and the catalyst warming-up engine power Peset, this similarly continues the state that the catalyst warming-up engine power Peset is set to the engine required power Pe\* and continues the catalyst warm-up control. As a result, this suppresses deterioration of the emission.

When it is determined at step S160 that the driving required power Pd\* is larger than the total power of the output limit Wout of the battery 50 and the catalyst warming-up engine power Peset (affirmative answer), on the other hand, the HVECU 70 subsequently determines whether the flag F2 is OFF (value 0) (step S170). When it is determined that the flag F2 is OFF (value 0), the HVECU 70 subsequently determines whether the driving required power Pd\* is larger than the total power of the output limit Wout of the battery 50 and an engine power Pe and whether the flag F1 is ON (value 1) (step S180). In this case, the output limit Wout of the battery 50 is smaller than the reference value Wref, so that the flag F1 is ON (value 1). When the driving required power Pd\* is equal to or smaller than the total power of the output limit Wout of the battery 50 and the engine power Pe, the HVECU 70 sets the power calculated by subtracting the output limit Wout of the battery 50 from the driving required power Pd\*, to the engine required power Pe\* (step S200) as in the case where the output limit Wout of the battery 50 is equal to or larger than the reference value Wref, and then terminates this routine. Continuation of this state similarly continues the state that the power calculated by subtracting the output limit Wout of the battery 50 from the driving required power Pd\* is set to the engine required power Pe\*. As a result, this suppresses deterioration of the emission and ensures the driving force required for driving the vehicle.

When the driving required power Pd\* is larger than the total power of the output limit Wout of the battery 50 and the engine power Pe, on the other hand, an affirmative answer is given at step S180. The HVECU 70 accordingly sets the driving required power Pd\* to the engine required power Pe\* and sets the flag F2 ON (value 1) (step S210) and then terminates this routine. In this case, the driving required power Pd\* is set to the engine required power Pe\*. This ensures the driving force for driving. During continuation of the state that the catalyst temperature Tc is lower than the reference value Tref, that the output limit Wout of the battery 50 is smaller than the reference value Wref and that the driving required power Pd\* is larger than the total power of the output limit Wout of the battery 50 and the catalyst warming-up engine power Peset, an affirmative answer is given at step S120, a negative answer is given at step S140, an affirmative answer is given at step S160, and a negative answer is given at step S170. The HVECU 70 then sets the driving required power Pd\* to the engine required power Pe\* and sets the flag F2 ON (value 1) at step S210. This continues the state that the driving required power Pd\* is set to the engine required power Pe\*. As a result, this continuously ensures the driving force for driving.

In the case where the output limit Wout of the battery 50 is kept smaller than the reference value Wref, when the driving required power Pd\* is equal to or smaller than the total power of the output limit Wout of the battery 50 and the catalyst warming-up engine power Peset, the HVECU 70 sets the catalyst warming-up engine power Peset to the engine required power Pe* (step S190) and performs the catalyst warm-up control. When the driving required power Pd* is larger than the total power of the output limit Wout of the battery 50 and the catalyst warming-up engine power Peset, on the other hand, the HVECU 70 sets the driving required power Pd* to the engine required power Pe* (step S210) and interrupts the catalyst warm-up control. This means that either the processing of step S190 or the processing of step S210 is selectively performed.

The following description is on the assumption of a shift from the state that the output limit Wout of the battery 50 is smaller than the reference value Wref to the state that the output limit Wout is equal to or larger than the reference value Wref. At this moment, the flag F1 is kept ON (value 1). In this case, when the driving required power Pd* is equal to or smaller than the total power of the output limit Wout of the battery 50 and the catalyst warming-up engine power Peset, the HVECU 70 sets the catalyst warming-up engine power Peset to the engine required power Pe* (step S190) and performs the catalyst warm-up control. When the driving required power Pd* is larger than the total power of the output limit Wout of the battery 50 and the catalyst warming-up engine power Peset, on the other hand, since the flag F1 is ON (value 1), on determination that the driving required power Pd* is larger than the total power of the output limit Wout of the battery 50 and the engine power Pe, an affirmative answer is given at step S180. The HVECU 70 then sets the driving required power Pd* to the engine required power Pe* (step S210) and interrupts the catalyst warm-up control. Accordingly, even when the output limit Wout of the battery 50 is equal to or larger than the reference value Wref, either the processing of step S190 or the processing of step S210 is selectively performed.

Figure 3:
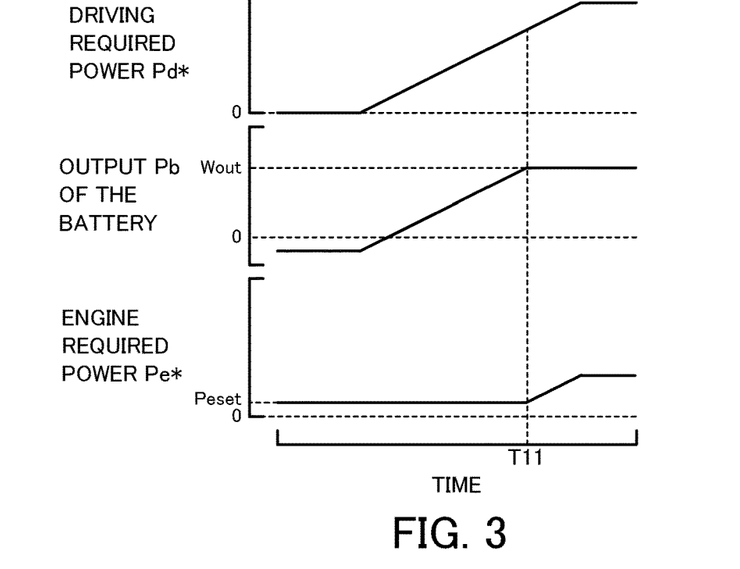
FIG. 3 is a diagram illustrating one example of a time change in driving required power Pd* and other time changes in the state that an output limit Wout of a battery 50 is equal to or larger than a reference value Wref, when a catalyst temperature Tc is lower than a reference value Tref.

FIG. 3 is a diagram illustrating one example of time changes in driving required power Pd*, output Pb of the battery 50, engine required power Pe* in the state that an output limit Wout of a battery 50 is equal to or larger than a reference value Wref, when a catalyst temperature Tc is lower than a reference value Tref. When the output limit Wout of the battery 50 is equal to or larger than the reference value Wref, an output Pb of the battery 50 increases with an increase in driving required power Pd* until a time T11 when the driver's depression of the accelerator pedal 83 increases to cause the driving required power Pd* to reach the total power of the output limit Wout of the battery 50 and the catalyst warming-up engine power Peset. The engine required power Pe* is, on the other hand, kept to the catalyst warming-up engine power Peset. At the time T11, it is determined that the driving required power Pd* is larger than the total power of the output limit Wout of the battery 50 and the catalyst warming-up engine power Peset. The power calculated by subtracting the output limit Wout of the battery 50 from the driving required power Pd* is accordingly set to the engine required power Pe*. The output Pb of the battery 50 is thus kept to the output limit Wout, while the engine required power Pe* increases with an increase in driving required power Pd*. In the state that the output limit Wout of the battery 50 is equal to or larger than the reference value Wref, most part of the driving required power Pd* is covered by the output Pb of the battery 50. This enables the catalyst warm-up control to be continued for a long time period. Even in the case of interruption of the catalyst warm-up control, a relatively small power is set to the engine required power Pe*. This suppresses deterioration of the emission, compared with the case where a large power is set to the engine required power Pe*.

Figure 4:
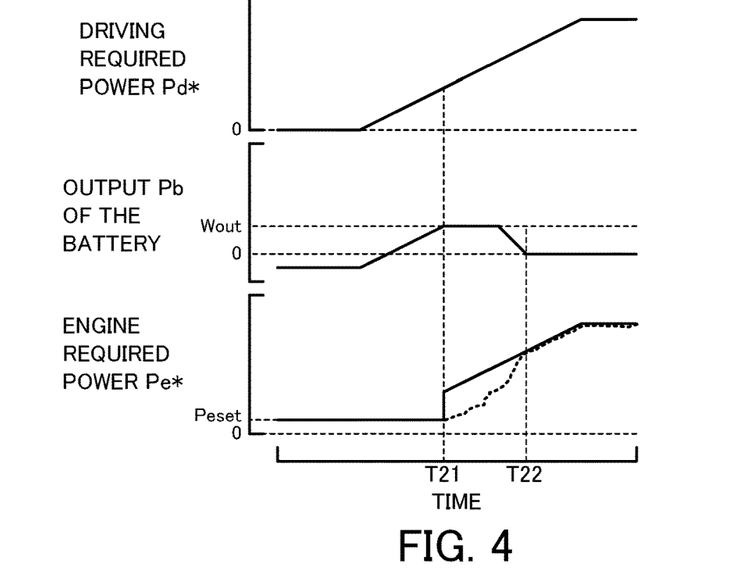
FIG. 4 is a diagram illustrating one example of a time change in driving required power Pd* and other time changes in the state that the output limit Wout of the battery 50 is smaller than the reference value Wref, when the catalyst temperature Tc is lower than the reference value Tref.

FIG. 4 is a diagram illustrating one example of time changes in driving required power Pd*, output Pb of the battery 50, and engine required power Pe* in the state that the output limit Wout of the battery 50 is smaller than the reference value Wref, when the catalyst temperature Tc is lower than the reference value Tref. A broken line curve of the engine required power Pe* indicates a variation in engine power Pe*. In the case where the output limit Wout of the battery 50 is smaller than the reference value Wref, the output Pb of the battery 50 increases with an increase in driving required power Pd* and the engine required power Pe* is kept to the catalyst warming-up engine power Peset until a time T21 when the driver's depression of the accelerator pedal 83 increases to cause the driving required power Pd* to reach the total power of the output limit Wout of the battery 50 and the catalyst warming-up engine power Peset, as in the case where the output limit Wout of the battery 50 is equal to or larger than the reference value Wref. At the time T21, it is determined that the driving required power Pd* is larger than the total power of the output limit Wout of the battery 50 and the catalyst warming-up engine power Peset, and it is also determined that the driving required power Pd* is larger than the total power of the output limit Wout of the battery 50 and the engine power Pe. The driving required power Pd* is accordingly set to the engine required power Pe*. The engine power Pe fails to follow an abrupt change of the engine required power Pe*. The battery 50 accordingly outputs a power (output Pb) close to the output limit Wout, in order to cause a shortfall of the driving required power Pd* to be output from the motor MG2. At a time T22 when the engine power Pe follows the engine required power Pe*, the output Pb of the battery 50 becomes zero. In the state that the output limit Wout of the battery 50 is smaller than the reference value Wref, the driving required power Pd* is often set to the engine required power Pe*. This ensures the driving force required for driving the vehicle even in the case of the small output Pb from the battery 50. When the engine power Pe fails to follow an abrupt change of the engine required power Pe*, the power corresponding to a delayed response is output from the battery 50. This suppresses the driver from feeling slow and ensures the driving force required for driving the vehicle.

Figure 5:
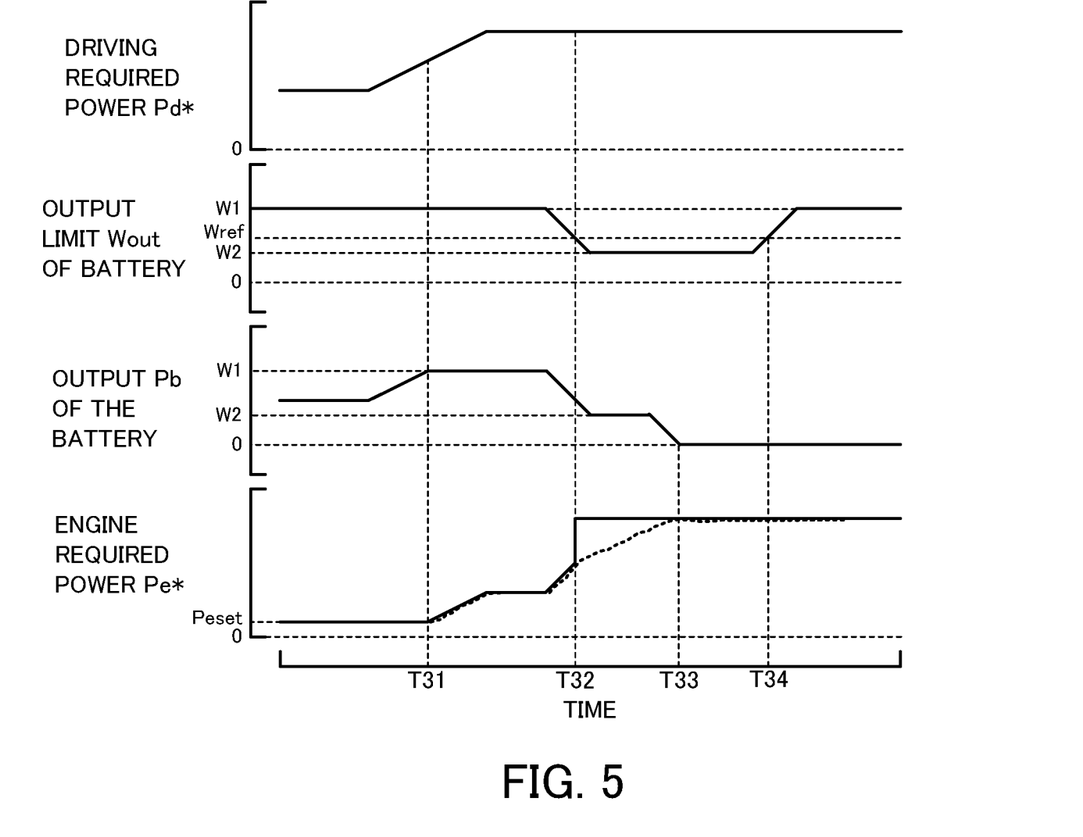
FIG. 5 is a diagram illustrating one example of a time change in driving required power Pd* and other time changes in the case of shifts between the state that the output limit Wout of the battery 50 is equal to or larger than the reference value Wref and the state that the output limit Wout of the battery 50 is smaller than the reference value, when the catalyst temperature Tc is lower than the reference value Tref.

FIG. 5 is a diagram illustrating one example of time changes in driving required power Pd*, output limit of Wout of the battery 50, output Pb of the battery and engine required power Pe* in the case of shifts between the state that the output limit Wout of the battery 50 is equal to or larger than the reference value Wref and the state that the output limit Wout of the battery is smaller than the reference value, when the catalyst temperature Tc is lower than the reference value Tref. A broken line curve of the engine required power Pe* indicates a variation in engine power Pe*. In the case where the output limit Wout of the battery 50 is equal to or larger than the reference value Wref, the output Pb of the battery 50 increases with an increase in driving required power Pd* and the engine required power Pe* is kept to the catalyst warming-up engine power Peset until a time T31 when the driving required power Pd* reaches the total power of the output limit Wout of the battery 50 and the catalyst warming-up engine power Peset. At the time T31, it is determined that the driving required power Pd* is larger than the total power of the output limit Wout of the battery 50 and the catalyst warming-up engine power Peset. The power calculated by subtracting the output limit Wout of the battery 50 from the driving required power Pd* is accordingly set to the engine required power Pe*. This causes the output Pb of the battery 50 to be kept to the output limit Wout and causes the engine required power Pe* to increase with an increase in driving required power Pd*. At a time T32 of a shift from the state that the output limit Wout of the battery 50 is equal to or larger than the reference value Wref to the state that the output limit Wout of the battery 50 is smaller than the reference value Wref, it is determined that the driving required power Pd* is larger than the total power of the output limit Wout of the battery 50 and the catalyst warming-up engine power Peset, and it is also determined that the driving required power Pd* is larger than the total power of the output limit Wout of the battery 50 and the engine power Pe. The driving required power Pd* is accordingly set to the engine required power Pe*. The engine power Pe fails to follow an abrupt change of the engine required power Pe*. The battery 50 accordingly outputs a power (output Pb) close to the output limit Wout, in order to cause a shortfall of the driving required power Pd* to be output from the motor MG2. At a time T33 when the engine power Pe follows the engine required power Pe*, the output Pb of the battery 50 becomes zero. Even after a time T34 of a shift from the state that the output limit Wout of the battery 50 is smaller than the reference value Wref to the state that the output limit Wout of the battery 50 is equal to or larger than the reference value Wref, the flag F1 is kept ON (value 1). This continues the state that the driving required power Pd* is set to the engine required power Pe*. This suppresses the driver from feeling strange due to an abrupt change of the engine required power Pe* caused by a shift from the state that the output limit Wout of the battery 50 is smaller than the reference value Wref to the state that the output limit Wout of the battery 50 is equal to or larger than the reference value Wref.

As described above, in the case where the catalyst temperature Tc is lower than the reference value Tref and where the output limit Wout of the battery 50 is equal to or larger than the reference value Wref, when the driving required power Pd* is equal to or smaller than the total power of the output limit Wout of the battery 50 and the catalyst warming-up engine power Peset, the hybrid vehicle 20 of the embodiment sets the catalyst warming-up engine power Peset to the engine required power Pe* and performs the catalyst warm-up control. In this case, most part of the driving required power Pd* is covered by the output Pb of the battery 50. This enables the catalyst warm-up control to be continued for a long time period. When the driving required power Pd* is larger than the total power of the output limit Wout of the battery 50 and the catalyst warming-up engine power Peset, on the other hand, the hybrid vehicle 20 of the embodiment sets the power calculated by subtracting the output limit Wout of the battery 50 from the driving required power Pd*, to the engine required power Pe* and interrupts the catalyst warm-up control. In this case, a relatively small power is set to the engine required power Pe*. This accordingly suppresses deterioration of the emission, compared with the case where a large power is set to the engine required power Pe*.

In the case where the catalyst temperature Tc is lower than the reference value Tref and where the output limit Wout of the battery 50 is smaller than the reference value Wref, when the driving required power Pd* is equal to or smaller than the total power of the output limit Wout of the battery 50 and the catalyst warming-up engine power Peset, the hybrid vehicle 20 of the embodiment sets the catalyst warming-up engine power Peset to the engine required power Pe* and performs the catalyst warm-up control. Performing the catalyst warm-up control even for a short time period suppresses deterioration of the emission. When the driving required power Pd* is larger than the total power of the output limit Wout of the battery 50 and the catalyst warming-up engine power Peset, on the other hand, the hybrid vehicle 20 of the embodiment sets the driving required power Pd* to the engine required power Pe* and interrupts the catalyst warm-up control. The engine power Pe fails to follow an abrupt change of the engine required power Pe*. The battery 50 accordingly outputs a power (output Pb) close to the output limit Wout, in order to cause a shortfall of the driving required power Pd* to be output from the motor MG2. This suppresses the driver from feeling slow and ensures the driving force required for driving the vehicle.

Even in the case of a shift from the state that the output limit Wout of the battery 50 is smaller than the reference value Wref to the state that the output limit Wout of the battery 50 is equal to or larger than the reference value Wref, the hybrid vehicle 20 of the embodiment continues setting the driving required power Pd* to the engine required power Pe*. This suppresses the driver from feeling strange due to an abrupt change of the engine required power Pe*.

Even in the case of a shift from the state that the output limit Wout of the battery 50 is smaller than the reference value Wref to the state that the output limit Wout of the battery 50 is equal to or larger than the reference value Wref, the hybrid vehicle 20 of the embodiment continues setting the driving required power Pd* to the engine required power Pe*. According to a modification, the power calculated by subtracting the output limit Wout of the battery 50 from the driving required power Pd* may be set to the engine required power Pe* in the case of a shift to the state that the output limit Wout of the battery 50 is equal to or larger than the reference value Wref.

The hybrid vehicle 20 of the embodiment is configured such that the engine 22 and the motor MG1 are connected via the planetary gear 30 with the driveshaft 36 which is coupled with the drive wheels 38a and 38b, that the motor MG2 is connected with the driveshaft 36 and that the battery 50 is electrically connected with the motors MG1 and MG2. This configuration is, however, not essential, but a hybrid vehicle may have any configuration including an engine configured to output a power for driving the vehicle and a motor configured to output a power for driving the vehicle. For example, the hybrid vehicle may be configured such that a rotating shaft of a motor is connected via a transmission with a driveshaft which is coupled with drive wheels, that an engine is connected via a clutch with the rotating shaft of the motor and that a battery is electrically connected with the motor.

In the hybrid vehicle of the above aspect, when the catalyst temperature is equal to or lower than the predetermined temperature, the control device may set the driving required power to the engine required power in response to a shift from the state that the output upper limit power is smaller than the predetermined power to the state that the output upper limit power is equal to or larger than the predetermined power. This configuration maintains the state that the driving required power is set to the engine required power and suppresses the driver from feeling strange in the case of an abrupt change of the engine required power that is caused by a change to the state that the power calculated by subtracting the output upper limit power from the driving required power is set to the engine required power.

In the hybrid vehicle of the above aspect, when the driving required power is set to the engine required power, the control device may set a total power by summing up a power used to charge the power storage device and the driving required power, to the engine required power. This configuration increases the output upper limit power of the power storage device and enables a larger part of a response delay of the engine power relative to the driving required power to be covered by the power from the power storage device.

In the hybrid vehicle of the above aspect, when the catalyst temperature is equal to or lower than the predetermined temperature and the driving required power is equal to or smaller than a total power of the output upper limit power and a catalyst warming-up engine power, the control device may set the catalyst warming-up engine power to the engine required power. The catalyst warming-up engine power denotes a power that is output from the engine on average during the catalyst warm-up control and may be determined in advance by experiment or the like. This configuration enables the catalyst warm-up to be performed and suppresses deterioration of the emission.

The following describes the correspondence relationship between the primary elements of the above embodiment and the primary elements of the disclosure described in Summary. The exhaust emission control device 25 of the embodiment corresponds to the "exhaust emission control device", the engine 22 corresponds to the "engine", the motor MG2 corresponds to the "motor", the battery 50 corresponds the "power storage device", and the HVECU 70, the engine ECU 24, the motor ECU 40 and the battery ECU 52 correspond to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of hybrid vehicles.

The invention claimed is:

1. A hybrid vehicle, comprising:
an engine provided with an exhaust emission control device in an exhaust system thereof, and the engine is configured to output a power for driving the vehicle;
a motor configured to output a power for driving the vehicle;
a battery configured to transmit electric power to and from the motor; and
an electronic control unit configured to control the motor such as to drive the hybrid vehicle with a driving required power that is based on a driver's operation, during a motor drive without operation of the engine, and to set an engine required power based on the driving required power and control the engine such as to output the engine required power, while controlling the motor such as to drive the hybrid vehicle with the driving required power, during a hybrid drive with operation of the engine, the electronic control unit is configured to compare an output upper limit power which the battery is allowed to output to a predetermined power,
wherein when a catalyst temperature of the exhaust emission control device is equal to or lower than a predetermined temperature that requires warming up,
(1) in a state that the output upper limit power is equal to or larger than the predetermined power, the electronic control unit sets a power calculated by subtracting the output upper limit power from the driving required power, to the engine required power, and
(2) in a state that the output upper limit power is smaller than the predetermined power, the electronic control unit sets the driving required power to the engine required power.

2. The hybrid vehicle according to claim 1,
wherein when the catalyst temperature is equal to or lower than the predetermined temperature, the electronic control unit sets the driving required power to the engine required power in response to a shift from the state that the output upper limit power is smaller than the predetermined power to the state that the output upper limit power is equal to or larger than the predetermined power.

3. The hybrid vehicle according to claim 1,
wherein when the electronic control unit sets the driving required power to the engine required power, the electronic control unit instead sets a total power by summing up a power used to charge the battery and the driving required power, to the engine required power.

4. The hybrid vehicle according to claim 1,
wherein when the catalyst temperature is equal to or lower than the predetermined temperature and the driving required power is equal to or smaller than a total power of the output upper limit power and a catalyst warming-up engine power, the electronic control unit sets the catalyst warming-up engine power to the engine required power.

5. The hybrid vehicle according to claim 2,
wherein when the electronic control unit sets the driving required power to the engine required power, the electronic control unit instead sets a total power by summing up a power used to charge the battery and the driving required power, to the engine required power.

6. The hybrid vehicle according to claim 2,
wherein when the catalyst temperature is equal to or lower than the predetermined temperature and the driving required power is equal to or smaller than a total power of the output upper limit power and a catalyst warming-up engine power, the electronic control unit sets the catalyst warming-up engine power to the engine required power.

7. The hybrid vehicle according to claim 3,
wherein when the catalyst temperature is equal to or lower than the predetermined temperature and the driving required power is equal to or smaller than a total power of the output upper limit power and a catalyst warming-up engine power, the electronic control unit sets the catalyst warming-up engine power to the engine required power.

* * * * *

UNITED STATES PATENT AND TRADEMARK OFFICE
CERTIFICATE OF CORRECTION

PATENT NO. : 11,001,251 B2
APPLICATION NO. : 16/197963
DATED : May 11, 2021
INVENTOR(S) : Hideki Kamatani, Kazuma Aoki and Koji Hokoi Page 1 of 1

It is certified that error appears in the above-identified patent and that said Letters Patent is hereby corrected as shown below:

In the Specification

In Column 4, Line(s) 67, delete "δm1" and insert --θm1--, therefor.

In Column 7, Line(s) 33, delete "shy" and insert --shv--, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*